US008780776B2

(12) United States Patent
Kao et al.

(10) Patent No.: US 8,780,776 B2
(45) Date of Patent: Jul. 15, 2014

(54) REALIZATION OF SLEEP AND RECONNECTING FUNCTIONS ON NETWORK SYSTEM AND THE METHOD

(75) Inventors: Jung-Chun Kao, New Taipei (TW); Kai-Wei Chiou, Tainan (TW); Te-Li Wang, New Taipei (TW); Fu-Wen Chen, Changhua County (TW)

(73) Assignee: National Tsing Hua University, Hsinchu (TW)

( * ) Notice: Subject to any disclaimer, the term of this patent is extended or adjusted under 35 U.S.C. 154(b) by 209 days.

(21) Appl. No.: 13/341,793

(22) Filed: Dec. 30, 2011

(65) Prior Publication Data

US 2013/0039240 A1 Feb. 14, 2013

(30) Foreign Application Priority Data

Aug. 12, 2011 (TW) .............................. 100128910 A

(51) Int. Cl.
*H04W 52/02* (2009.01)
(52) U.S. Cl.
USPC ............................ 370/311; 370/255; 370/328
(58) Field of Classification Search
USPC .......................................... 370/254, 311, 503
See application file for complete search history.

(56) References Cited

U.S. PATENT DOCUMENTS

| 2009/0147714 A1* | 6/2009 | Jain et al. | 370/311 |
| 2010/0061272 A1* | 3/2010 | Veillette | 370/254 |
| 2010/0124240 A1* | 5/2010 | Lu et al. | 370/503 |
| 2012/0195495 A1* | 8/2012 | Shiell et al. | 382/159 |

OTHER PUBLICATIONS

Chipcon Products from Texas Instruments, Power Management.*
Chipcon Products from Texas Instruments, 802.15.4 MAC Application Programming Interface, Version 1.1, Document No. F8W-2005-1503, Mar. 19, 2007 pp. i-v and pp. 1-49.
Cheng FU et al., "An Enhanced Sensor Scheduling Protocol for Wireless Sensor Networks" The 28th International Conference on Distributed Computing Systems Workshops, Beijing, China, Jun. 17-20, 2008, pp. 303-308.
Junchao MA et al., "Energy Efficient TDMA Sleep Scheduling in Wireless Sensor Networks" 2009 Proceedings IEEE INFOCOM, Rio de Janeiro, Brazil, Apr. 19-25, 2009, pp. 630-638.
You-Chiun Wang et al., "Multi-Resolution Spatial and Temporal Coding in a Wireless Sensor Network for Long-Term Monitoring Applications" *IEEE Transactions on Computers*, vol. 58 Issue 6, Jun. 2009.
Chipcon Products from Texas Instruments, Application Note: Power Management for the CC2430DB, Document No. F8W-2006-0019, pp. i-ii and pp. 1-11, Aug. 28, 2007.

(Continued)

*Primary Examiner* — Anh-Vu Ly
*Assistant Examiner* — Hashim Bhatti
(74) *Attorney, Agent, or Firm* — Muncy, Geissler, Olds & Lowe, P.C.

(57) ABSTRACT

Realization of sleep and reconnecting functions is developed for network systems which comprise a number of end devices, network path sharing devices and coordinators. End devices and, even, network path sharing devices can be enforced to enter a sleep state at the first preset times and wake up at the second preset times. The two preset times are either assigned offline or adjustable at run time, according to the actual traffic load in the network. When a node wakes up, it checks whether the corresponding parent node is in the active state or not. If the corresponding parent node is not in the active state, the node will find a new parent node to establish a new transmission path.

6 Claims, 5 Drawing Sheets

(56) References Cited

OTHER PUBLICATIONS

Torgeir Sundet, Texas Instruments, SWRA162B, Design Note DN106, "Power Modes in CC111xFx, CC243x, and CC251xFx", pp. 1-14, Feb. 23, 2009.

B. Selvig, Texas Instruments, SWRA144, Application Note AN053, "Measuring Power Consumption with CC2430 & Z-Stack" pp. 1-17, Aug. 7, 2007.

Wei YE et al., "An Energy-Efficient MAC Protocol for Wireless Sensor Networks", pp. 1-10, Nov. 7, 2002.

T. Van Dam et al., "An Adaptive Energy-Efficient MAC Protocol for Wireless Sensor Networks", SenSys '03, Nov. 5-7, 2003, Los Angeles, California, pp. 1-10.

\* cited by examiner

| Parameter | Min | Typ | Max | Unit | Condition |
|---|---|---|---|---|---|
| Power mode 1 | | 190 | | µA | Digital regulator on, 16 MHz RCOSC and 32 MHz crystal oscillator off. 32.768 kHz XOSC, POR and ST active. RAM retention. |
| Power mode 2 | | 0.5 | | µA | Digital regulator off, 16 MHz RCOSC and 32 MHz crystal oscillator off. 32.768 kHz XOSC, POR and ST active. RAM retention. |
| Power mode 3 | | 0.3 | | µA | No clocks. RAM retention. POR active. |

FIG. 2B

REALIZATION OF SLEEP AND RECONNECTING FUNCTIONS ON NETWORK SYSTEM AND THE METHOD

BACKGROUND OF THE INVENTION (a) Field of the Invention

The invention relates to a network system, particularly to a network system in which network path sharing devices tend to enter a sleep state for energy savings.

(b) Description of the Related Art

ZigBee is a specification for a suite of communication protocols using small, short-range, low-power devices based on an IEEE 802 standard for personal area networks. There are three different types of ZigBee devices—coordinator, router, and end device. Only ZigBee end devices are allowed to enter the sleep state, whereas ZigBee coordinator and ZigBee routers are not able to enter the sleep state. When an end device is too far apart from the coordinator, data collected by the end device is passed back to the coordinator in a multi-hop manner, via a path formed by a number of network path sharing devices (i.e., routers).

However, in a ZigBee network, network path sharing devices, which are responsible for maintaining a network backbone, have no sleep mechanism built in and thus cannot enter a sleep state to save energy. Even worse, without additional mechanism(s), a network path sharing device in a sleep state, if it were allowed, would make the network disconnected. Considering network path sharing devices are the nodes at large load, their power consumption is high.

Network path sharing devices deployed at a location without power outlets are usually powered by batteries. High power consumption at a network path sharing device may easily result in battery depletion. When a network path sharing device has no remaining battery capacity, the network becomes disconnected and end devices become unable to communicate to the coordinator.

BRIEF SUMMARY OF THE INVENTION

Therefore, one object of the invention is to provide a network system to enforce a network path sharing device to enter the sleep state.

One object of the invention is to provide a network system to decrease power consumption of a network path sharing device.

One object of the invention is to provide a network system to prolong lifetime of a wireless network.

One object of the invention is to provide a network system to maintain operation of a wireless network even if the parent node of the network path sharing device is not in an active state.

One embodiment of the invention provides a network sleep system, comprising a plurality of end devices, a plurality of network path sharing devices and a single or a plurality of coordinators. Network path sharing devices and end devices can enter the sleep state at the first preset times and wake up at the second preset times.

One embodiment of the invention provides a method of sleeping and reconnecting mechanism for network path sharing devices in a network system, comprising the following steps: determining whether itself is a network path sharing device or not; entering a sleep state at the first preset time and waking up at the second preset time; after waking up, determining whether its parent node is in an active state or not; and searching for a new parent node to establish a new transmission path, if the parent node is not in an active state.

BRIEF DESCRIPTION OF THE DRAWINGS

FIG. 2B shows a specification table of a sleep mode according to one embodiment of the invention.

DETAILED DESCRIPTION OF THE INVENTION

Figure 1:
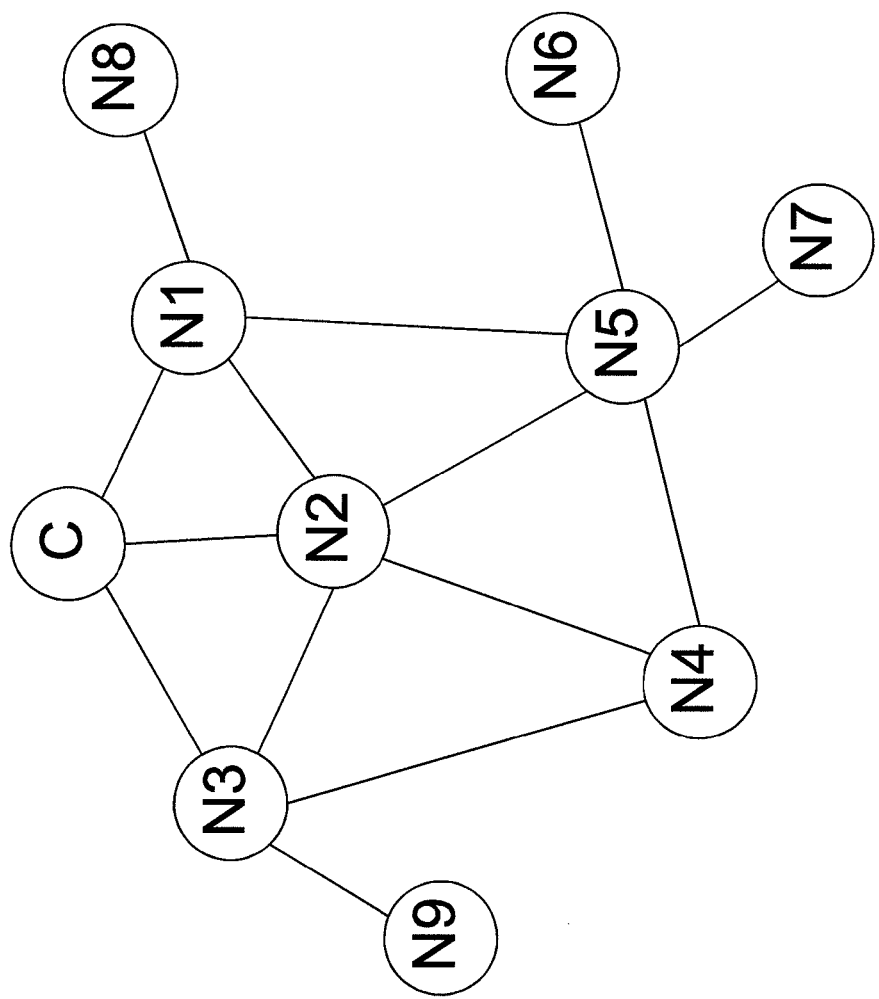
FIG. 1 shows a schematic diagram illustrating a network system according to one embodiment of the invention.

Please refer to FIG. 1. FIG. 1 shows a schematic diagram illustrating a network system according to one embodiment of the invention. The network system 100 includes nine nodes N1~N9 and a coordinator C. In this embodiment, the wireless network is a ZigBee wireless network. The number of nodes of the network system 100 is not limited to this number, that is, 9.

The coordinator C is responsible to establish a wireless network. The nodes N1~N5 are network path sharing devices while the nodes N6~N9 are end devices of a ZigBee network. In one embodiment, the end device can be a sensing unit to sense environmental data at which it is located. The network path sharing devices comprise the backbone of the ZigBee wireless network and have functions of passing data from or to the coordinator C. In this embodiment, the network path sharing device also has a sensing function and can sense the environmental data at which it is located. It should be noted that the devices corresponding to the nodes N1~N9 can be adjusted according actual needs of users. The invention is not limited to the above example.

In one embodiment, the network path sharing device can be implemented by a router. The nodes N1~N5 can be used to relay the environmental data sensed by the nodes N6~N9 to the coordinator C. It should be noted that the end device can be, but not limited to, a sensing unit in this embodiment. The end device can be implemented by an electric power device, a video device and so forth.

For example, for the node N1, the nodes N5 and N8 are the corresponding children nodes. In other words, the node N1 is the parent node of the nodes N5 and N8. For the node N5, the nodes N6 and N7 are the corresponding children nodes. In other words, the node N5 is the parent node of the nodes N6 and N7. For the node N4, the nodes N2, N3 and N5 are candidates for the corresponding parent node.

It can be seen that the network system 100 comprises a plurality of children nodes and a plurality of parent nodes. For each node, it can be a children node of the other node(s) or a parent node of the other node(s), depending on the configuration of the whole wireless network but the invention is not limited to this example. In other words, a network path sharing device also can be a children node or a parent node.

Figure 2A:
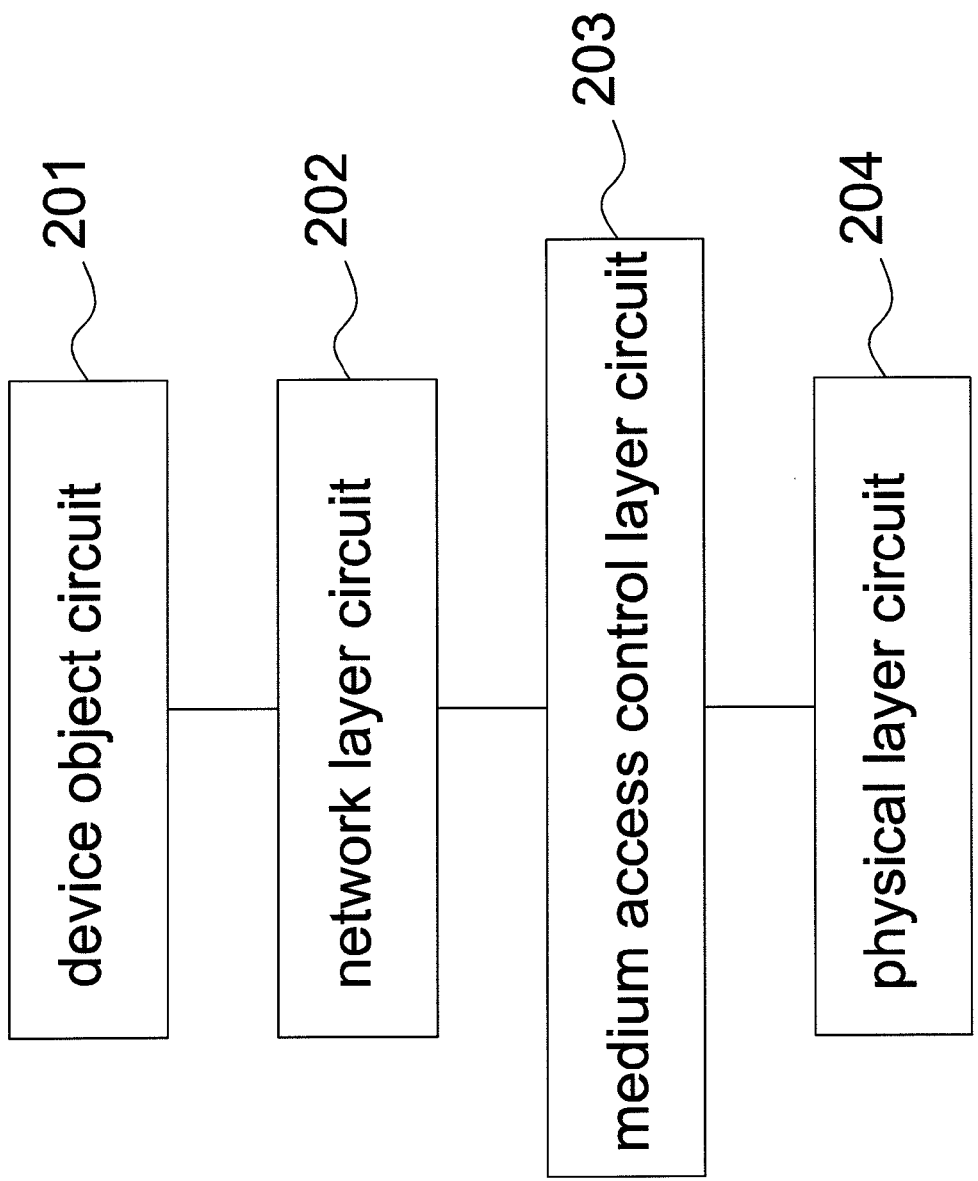
FIG. 2A shows a block diagram illustrating a network system according to one embodiment of the invention.

Please refer to FIG. 2A. FIG. 2A shows a block diagram illustrating the network system 100 according to one embodiment of the invention. The network path sharing device comprises a device object circuit 201, a network layer circuit 202, a medium access control layer circuit 203, and a physical layer circuit 204. The physical layer circuit 204 is used to transmit and receive packets.

The main control program of the invention is written into the medium access control layer circuit 203. Through the medium access control layer circuit 203, each node determines whether or not to enter a sleep state according to the device type and current status.

Then, please refer to the function macSleep( ). This function is a part of internal program codes of standard publication version of ZigBee network system:

```
uint8 macSleep(uint8 sleepState)
{
    /* if either RX or TX is active or any RX enable flags are set, it's
    not OK to sleep */
        if (macRxActive || macRxOutgoingAckFlag || macTxActive ||
    macRxEnableFlags)
        {
            return(FALSE);
        }
}
```

In the part of internal program codes of standard publication version of ZigBee network system according to the prior art, all network path sharing devices cannot enter the sleep state. This is because MAC_PwrOffReq(MAC_PWR_SLEEP_DEEP) always returns FALSE at all network path sharing devices.

In this embodiment, when the node is a network path sharing device, the node cannot enter the sleep state. The reason is that, the function MAC_PwrOffReq( ) calls uint 8 macSleep(uint 8 sleepState) whose main functionality is to close the wireless RF module. Because the wireless RF module of any network path sharing device is always in an active state and the line "if (macRxActive||macRxOutgoing AckFlag||macTxActive||macRxEnableFlags)" notices the active state of the wireless RF module of the network path sharing device, the wireless RF module cannot be turned off and consequently the network path sharing device cannot enter the sleep state.

The above mentioned program codes prevent any network path sharing device from turning off the wireless RF module. As a result, the operation of "turning off the wireless RF module of the router" requested in halSleep( ) is prohibited at any network path sharing device. All the network path sharing devices (in this embodiment, being a router) in the original ZigBee network system must keep awake to transmit packets to or from the coordinator C. In other words, by the above mentioned program codes.

It should be noted that the part of internal program codes of standard publication version of ZigBee network system is revised in one embodiment of the invention. In other words, the function halSleep( ) is modified to have the nodes N1~N9 become able to stay in the sleep state if the nodes N1~N9 are the network path sharing devices; otherwise, a network path sharing device would be woken up by irrelevant events. The program codes of the function halSleep( ) after modified in this embodiment are as follows:

```
void halSleep ( uint16 osal_timeout )
{
    uint32              timeout = 0 ;
    halIntState_t intState , ien0 , ien1 , ien2 ;
    timeout = HAL_SLEEP_MS_TO_320US (osal_timeout );
    if (MAC_PwrOffReq (MAC_PWR_SLEEP_DEEP) ==
MAC_SUCCESS )
    {
        HAL_SLEEP_SET_MAIN_CLOCK_RC ( );
        halSleepSetTimer (timeout );
```

-continued

```
        HAL_SLEEP_SET_POWER_MODE(CC2430_PM1);
        HAL_SLEEP_SET_MAIN_CLOCK_CRYSTAL ( );
        MAC_PwrOnReq( );
        osal_adjust_timers( );
    }
}
```

The network path sharing device can enter a sleep state by the above modified function halSleep( ). At first, the function HAL_SLEEP_MS_TO_320US (osal_timeout) sets the sleep time length. When the operation "if (MAC_PwrOffReq (MAC_PWR_SLEEP_DEEP)==MAC_SUCCESS)" determines that the node can enter the sleep mode, the function HAL_SLEEP_SETMAIN_CLOCKRC( ) records the current system time because the system main clock is closed at the sleep state and the sleep timer is used instead to record the time elapsed in the sleep mode. Then, the function halSleepSetTimer (timeout) is used to set the sleep time length of the network path sharing device and a user can set the network path sharing device to enter a sleep state at the first preset time and wake up at the second preset time. Furthermore, when the network path sharing device enters the sleep state, power mode PM1 specified by ZigBee network system is selected according to the function HAL_SLEEPSET_POWER-MODE (CC2430_PM1) and the node enters sleep state in PM1 mode.

When the network path sharing device wakes up, the function HAL_SLEEP_SETMAIN_CLOCK_CRYSTAL( ) is used to recover back to the system main clock. The function MAC_PwrOnReq( ) restarts the wireless RF module of the network path sharing device to continue packet transmission and the function osal_adjust_timers( ) feedbacks the time interval of being sleep to the system main clock, in order to calibrate the system time of the network path sharing device that just woke up.

It should be noted that the power mode specified by ZigBee network system can be divided into three levels: power mode 1 (PM1), power mode 2 (PM2), and power mode 3 (PM3). The detailed specification can be referred to FIG. 2B. The power modes PM1 and PM2 are light sleep modes and can be woken up by the internal timer. The power mode PM3 is a deep sleep mode and can only be woken up externally (for example: clicking a button by a user).

In addition to time calibration by the function osal_adjust_timers( ), a node can check whether or not the corresponding parent node is in the active state. It is possible that the parent node is not active even if the parent node is not dead. Nodes might enter the sleep state at their first preset times and wake up at their second preset times.

However, in the network configuration originally set by ZigBee, a network path sharing device never enters a sleep state. A network path sharing device is always active unless it is shut down by a user or it fails. In an original ZigBee network, as long as a node leaves (for example, breaks down or is shut down manually), its corresponding children nodes cannot reconnect to other network path sharing devices.

For example, in a ZigBee network system according to the prior technology, if the node N5 is not in the active state, the corresponding children nodes (nodes N6 and N7) cannot reconnect to their parent node. Afterward, the nodes N6 and N7 cannot transmit sensing data and the whole sensing network cannot operate normally.

However, in a ZigBee network system according to the invention, if a node finds out that its parent node is not in the active state, ZDO_SyncIndicationCB( ) will be called. We modify the program codes of standard publication version of ZigBee network system such that the function ZDO_StartDevice( ) is called which makes the network layer circuit 202 establish a new transmission path to avoid the sensing data of the end device unable to be transmitted.

Figure 3:
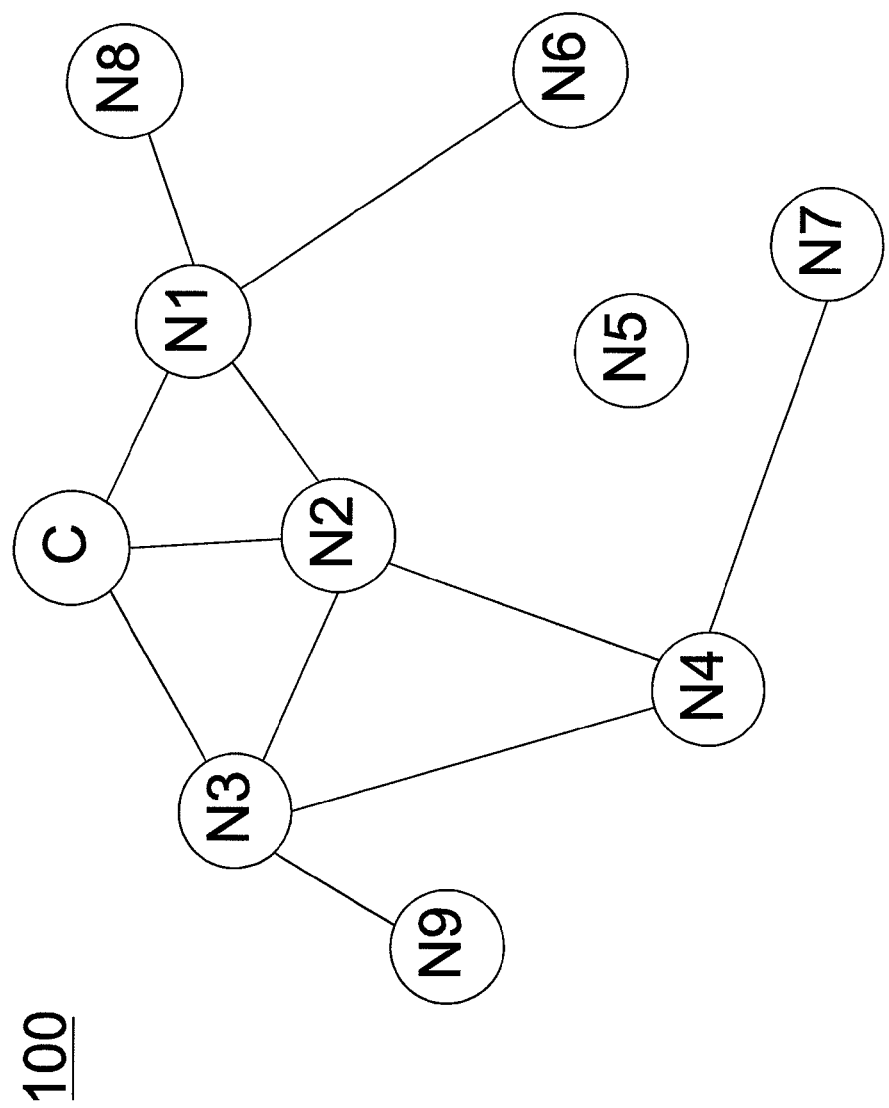
FIG. 3 shows a schematic diagram illustrating a network system establishing the new transmission path according to one embodiment of the invention.

For example, please refer to FIG. 3. FIG. 3 shows a schematic diagram illustrating the network system 100 establishing the new transmission path according to one embodiment of the invention. It is assumed that the node N5 is not in the active state. Thus, the medium access control layer circuits 203 of the nodes N6 and N7 controls the network layer circuit 202 to reset to establish the new transmission path. In this embodiment, the node is reconnected to the node N1 and the node N7 is reconnected to the node N4.

The program codes of the function ZDO_SyncIndicationCB( ) and the function ZDO_StartDevice( ) are as follows:

```
void ZDO_SyncIndicationCB( byte type, uint16 shortAddr )
{
    #if !defined ( RTR_NWK ) if ( type = = 1 )
    {
        ZDApp_SendMsg( ZDAppTaskID, ZDO_NWK_JOIN_REQ, sizeof(osal_event_hdr_t), NULL );
    }
    #else
        ZDO_StartDevice(NODETYPE_ROUTER,MODE_JOIN,
BEACON_ORDER_NO_BEACONS,
BEACON_ORDER_NO_BEACONS);
    #endif
    return;
}
```

From the above program codes, through the determination of the operation "#if !defined (RTR_NWK)", if the node is an end device, the function ZDApp_SendMsg(ZDAppTaskID, ZDO_NWK_JOIN_REQ, sizeof(osal_event_hdr_t), NULL) issues a packet for rejoining the network. If the node is a network path sharing device (i.e., a router), through ZDO_StartDevice(NODETYPE_ROUTER, MODE_JOIN, BEACON_ORDER_NO_BEACONS, BEACON_ORDER_NO_BEACONS), the network layer is reset to reconnect the node to a new parent node.

If the nodes N1~N9 of the network system 100 of invention are network path sharing devices, their own medium access control layer circuits 203 can confirm whether their parent nodes are in the active state or not within the user-defined time through the above program codes. When the corresponding parent node of each node N1~N9 is not in the active state, the invention enables the network layer circuit 202 to reset to establish the new transmission path.

Figure 4:
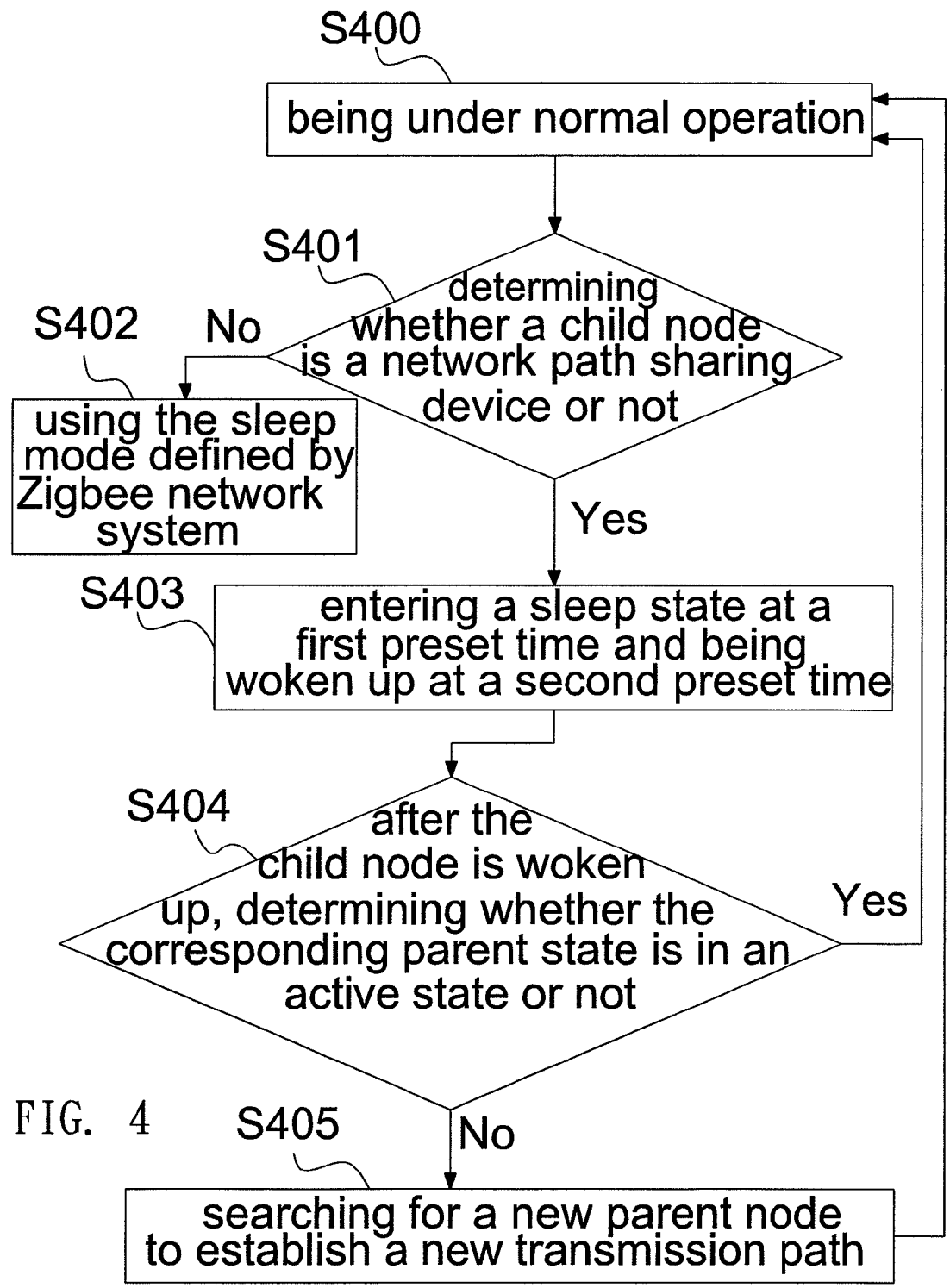
FIG. 4 shows a flow chart illustrating a method of sleep and reconnecting for a network system according to the invention.

Please refer to FIG. 4. FIG. 4 shows a flow chart illustrating a method of sleep and reconnecting for a network system according to the invention. The method comprises the following steps:

Step S400: being under normal operation;
Step S401: determining whether a node itself is a network path sharing device or not, jumping to step S402 if not, and jumping to step S403 if yes;
Step S402: using the sleep modes defined by ZigBee network system;
Step S403: entering a sleep state at a first preset time and waking up at a second preset time;
Step S404: determining whether the corresponding parent node is in an active state or not after a node itself wakes up, jumping to step S400 if yes, and jumping to step S405 if not; and
Step S405: searching for a new parent node to establish a new transmission path if the corresponding parent node is not in an active state, and then jumping to step S400.

In conclusion, the network system of the invention enables network path sharing devices to enter the sleep state for energy savings. At the same time, through the mechanism of establishing a new transmission path, the problem of being disconnected under the condition that the parent node is not in the active state can be solved.

Although the present invention has been fully described by the above embodiments, the embodiments should not constitute the limitation of the scope of the invention. Various modifications or changes can be made by those who are skilled in the art without deviating from the spirit of the invention.

What is claimed is:

1. A network system, comprising:
    a plurality of end devices;
    a plurality of network path sharing devices; and
    a single or a plurality of coordinators;
    wherein the end devices and, even, the network path sharing devices can be enforced to enter a sleep state at a first preset times and wake up at a second preset times; a corresponding parent node of an end device is either a network path sharing device or the coordinator; the corresponding parent node of the network path sharing device is either another network path sharing device or the coordinator; when a node intends to transmit data but the corresponding parent node is not in an active state, the node searches for a new parent node to establish a new transmission path; when the corresponding parent nodes are not in the active state, the children nodes reconnect to the new parent nodes and establish the new transmission paths via a device object circuit; and a child node comprises:
    a medium access control layer circuit, the medium access control circuit finds out whether the corresponding parent nodes are in the active state or not; and
    a network layer circuit, when the corresponding parent nodes are not in the active state, the network layer circuit is reset to establish the new transmission path.

2. The network system according to claim 1, wherein the network path sharing device is a router and the network system comprises at least one coordinator.

3. The network system according to claim 2, wherein a parent node is either the router or the coordinator and a children node is either the router or the end device.

4. The network system according to claim 3, wherein the end devices and the routers are used to sense environmental data at which they are located.

5. The network system according to claim 1, wherein the sleep state utilizes power mode 1 or power mode 2 defined by ZigBee network protocol; and the power consumption values of the two power modes are different.

6. The network system according to claim 1, wherein the network system is applied to a ZigBee network system.

* * * * *